C. B. CALLAN.
ATTACHMENT FOR LINOTYPE MACHINES.
APPLICATION FILED APR. 7, 1914.
1,132,557.
Patented Mar. 23, 1915.
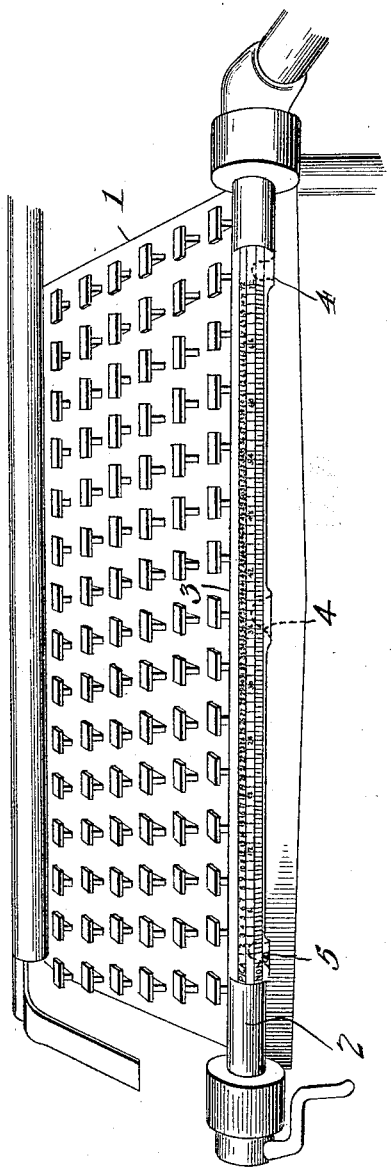
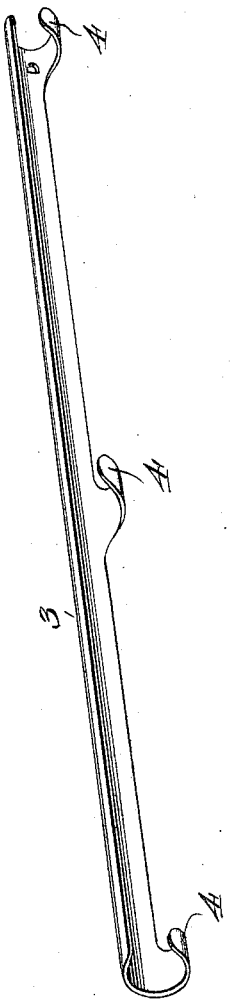

UNITED STATES PATENT OFFICE.

CHRISTOPHER B. CALLAN, OF AUSTIN, TEXAS.

ATTACHMENT FOR LINOTYPE-MACHINES.

1,132,557. Specification of Letters Patent. Patented Mar. 23, 1915.

Application filed April 7, 1914. Serial No. 830,195.

*To all whom it may concern:*

Be it known that I, CHRISTOPHER B. CALLAN, a citizen of the United States of America, residing at Austin, in the county of Travis and State of Texas, have invented certain new and useful Improvements in Attachments for Linotype-Machines, for which application for patent was filed April 7, 1914, Serial No. 830,195.

This invention relates to an attachment for a linotype machine comprising a stationary line measuring gage adapted to be arranged on the assembling elevator shaft in front of the keyboard in such a position that an operator can readily correct a proof or a reprint job, by simply folding the proof or job over the stationary line measuring gage in order to ascertain instantaneously, what measure or the number of ems at which to set the machine to make the required correction.

Another and further object of the invention is to provide a gage which is exceedingly simple and cheap in construction and which is composed of a single piece of metal bent to conform to the curvature of the assembling elevator shaft and which is provided with spring members for clamping the same in position thereon.

Other and further objects and advantages of the invention will be hereinafter set forth and the novel features thereof defined by the appended claim.

In the drawings—Figure 1, is a perspective of the keyboard of a linotype machine showing the application of my improved gage; and Fig. 2, is a perspective of the gage, detached.

Like numerals of reference refer to like parts in the several figures of the drawing.

In the drawing, 1 indicates the keyboard of a linotype machine, and 2 the assembling elevator shaft, which are of the ordinary construction now in use on linotype machines, and the above description is given so that the operation of my improved gage can be readily understood when used in connection therewith.

In constructing a gage in accordance with my invention, I employ a transversely curved strip 3 preferably formed of brass, the curvature of which, conforms to the curvature of the elevator shaft 2 and said strip along one of its edges is provided with integral spring fingers 4 adapted to embrace the elevator shaft and securely hold the strip in position as shown in Fig. 1. The outer face of the strip is provided with a series of parallelly arranged graduations, one series being marked with the numerals 1 to 72 inclusive, indicating pica; the next series being marked with the numerals 6, 12, 18, 24, 30, 36, 42, 48, 54, 60, 66 and 72 inclusive, indicating inches. There are six picas to the inch and the last series in which the inches are divided into twelfths, indicate nonpareil. The strip is slotted and a tongue 5 is punched outwardly therefrom to form a stop against which the proof or reprint to be corrected, is placed in using the gage, and it will be seen that by placing the gage in the position as shown, the operator can quickly ascertain what measure or the number of ems at which to set his machine.

From the foregoing description, it will be seen that I have provided an attachment for a linotype machine in the form of a measuring gage constructed in such a manner that the same can be quickly attached to the linotype machine adjacent the keyboard to facilitate the correcting of proofs and the like, by the operator.

I claim:

A gage for linotype machines, comprising a graduated strip curved transversely and provided with a stop at one end, and integral spring fingers for embracing a cylindrical member of a linotype machine for attaching the same thereto.

In testimony whereof I hereunto affix my signature in the presence of two witnesses.

CHRISTOPHER B. CALLAN.

Witnesses:
 GEO. P. WRIGHT,
 E. B. STOCKING.

Copies of this patent may be obtained for five cents each, by addressing the "Commissioner of Patents, Washington, D. C."